(12) United States Patent
Russell

(10) Patent No.: US 9,710,134 B1
(45) Date of Patent: Jul. 18, 2017

(54) SMART CONTACT LISTS

(71) Applicant: Amazon Technologies, Inc., Reno, NV (US)

(72) Inventor: Ryan Scott Russell, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 14/220,505

(22) Filed: Mar. 20, 2014

(51) Int. Cl.
*G06F 3/048* (2013.01)
*G06F 3/0482* (2013.01)

(52) U.S. Cl.
CPC .................... *G06F 3/0482* (2013.01)

(58) Field of Classification Search
CPC ............................ G06F 3/048–3/04883; G06F 17/30554–17/30991
See application file for complete search history.

(56) References Cited

U.S. PATENT DOCUMENTS

| | | | | |
|---|---|---|---|---|
| 2005/0071435 A1* | 3/2005 | Karstens | ............... | H04L 12/581 709/207 |
| 2006/0084478 A1* | 4/2006 | Erlichmen | ...... | H04M 1/274583 455/566 |
| 2010/0062753 A1* | 3/2010 | Wen | .................. | H04M 1/27455 455/418 |
| 2010/0223547 A1* | 9/2010 | Wilson | .................. | G06F 3/0237 715/261 |
| 2012/0054673 A1* | 3/2012 | Kim | ...................... | G06F 3/0482 715/784 |
| 2012/0210260 A1* | 8/2012 | Bederson | .............. | G06F 3/0488 715/765 |
| 2012/0278406 A1* | 11/2012 | Meisels | ................ | G06Q 10/107 709/206 |
| 2013/0159826 A1* | 6/2013 | Mason | .............. | G06F 17/30873 715/205 |

* cited by examiner

Primary Examiner — Claudia Dragoescu
(74) Attorney, Agent, or Firm — Athorus, PLLC

(57) ABSTRACT

A list of contacts or other files displayed on a computer device may be customized such that an order of the list, or a visual appearance of one or more of the files in the list, may indicate the extent of a user's behavior or activity with regard to the one or more files. The list may be reordered based on the frequency or recency of events associated with such behavior or activity, thereby causing more frequently or recently accessed files to be ranked higher in a list, and less frequently or recently accessed files to be ranked lower in the list. Additionally, an aspect of the appearances of the files in the list may be modified to reflect a frequency or recency with which events associated with one or more of the files have occurred.

20 Claims, 9 Drawing Sheets

SMART CONTACT LISTS

BACKGROUND

Many computer devices provide one or more software applications that permit users of such devices to store information regarding their personal connections to individuals or entities, which may be sometimes called "contacts." For example, personal information management software applications such as Microsoft® Outlook® commonly enable users to store telephone numbers, addresses, electronic mail (or "E-mail") addresses, images and other information for each of their contacts in virtual "cards" that may be accessed within a subset of a user interface provided by the software. Additionally, many modern mobile telephones permit users to enter and store similar information regarding their contacts into memory, and such information may be displayed to users in a list, typically arranged in an alphabetical order, when such users search for a telephone number. Web-based E-mail clients and like applications often provide similar features for receiving and storing contact information, as well.

While a contact list enables a user to access large amounts of information regarding his or her connections, a contact list may grow in size and complexity, and become difficult to use, for a number of reasons. First, many contact lists may include large amounts of outdated information, as users frequently neglect to properly manage their lists, such as by updating revised contacts or deleting irrelevant contacts. Second, because contact lists may be merged across devices and accounts, a user may be overwhelmed by the sheer number of contacts at his or her disposal, and may be forced to scroll through information regarding a large number of contacts within such lists in order to identify a contact. Third, most contact lists treat each contact as having equal value to a user, when in reality, a typical user usually communicates with only a small number or portion of his or her contacts on a regular basis.

Although some computer devices and communications applications permit users to maintain lists of contacts that are subsets of full, aggregated lists (e.g., a list of "VIP" contacts), such lists must also be properly filtered in order to ensure that the lists remain of manageable lengths, or that the lists may be easily accessed by such users in order to communicate with their most important contacts.

DETAILED DESCRIPTION

The systems and methods of the present disclosure are directed to providing temporal-based, event-based or access-based lists of contacts or other files. Specifically, the systems and methods disclosed herein may provide a user with a list of contacts files that adapts over time, and may automatically tune or sort itself on the basis of relevance or recency, or an awareness of the user's behavior or activity with regard to one or more of the files. For example, information regarding a contact with which the user has engaged in communication more recently in time may be visually distinguished within a list from contacts with which the user has not engaged in communication, or has engaged in communication less recently, such as by modifying at least one aspect (e.g., a font, a style, a size, a color) of the display of one or more of the contacts, or an order in which such contacts are displayed.

Moreover, the adaptable list may consider various events of a user's behavior or activity (e.g., actions taken by the user in order to communicate with a contact, or to otherwise access or use a file) across a number of platforms or systems when displaying information regarding the respective files, and such events may be synchronized across multiple discrete platforms or systems, such that the lists maintained on each platform may be tuned or sorted based on events of the user's behavior or activity that are observed regarding such files on any platform or system. The systems and methods disclosed herein may be provided in connection with any type or form of computer files that are typically shown in lists, including not only contacts or contact information but also browser bookmarks, multimedia files or any type or form of files or information that may be accessed by users with varying frequencies or for various durations.

Figure 1:
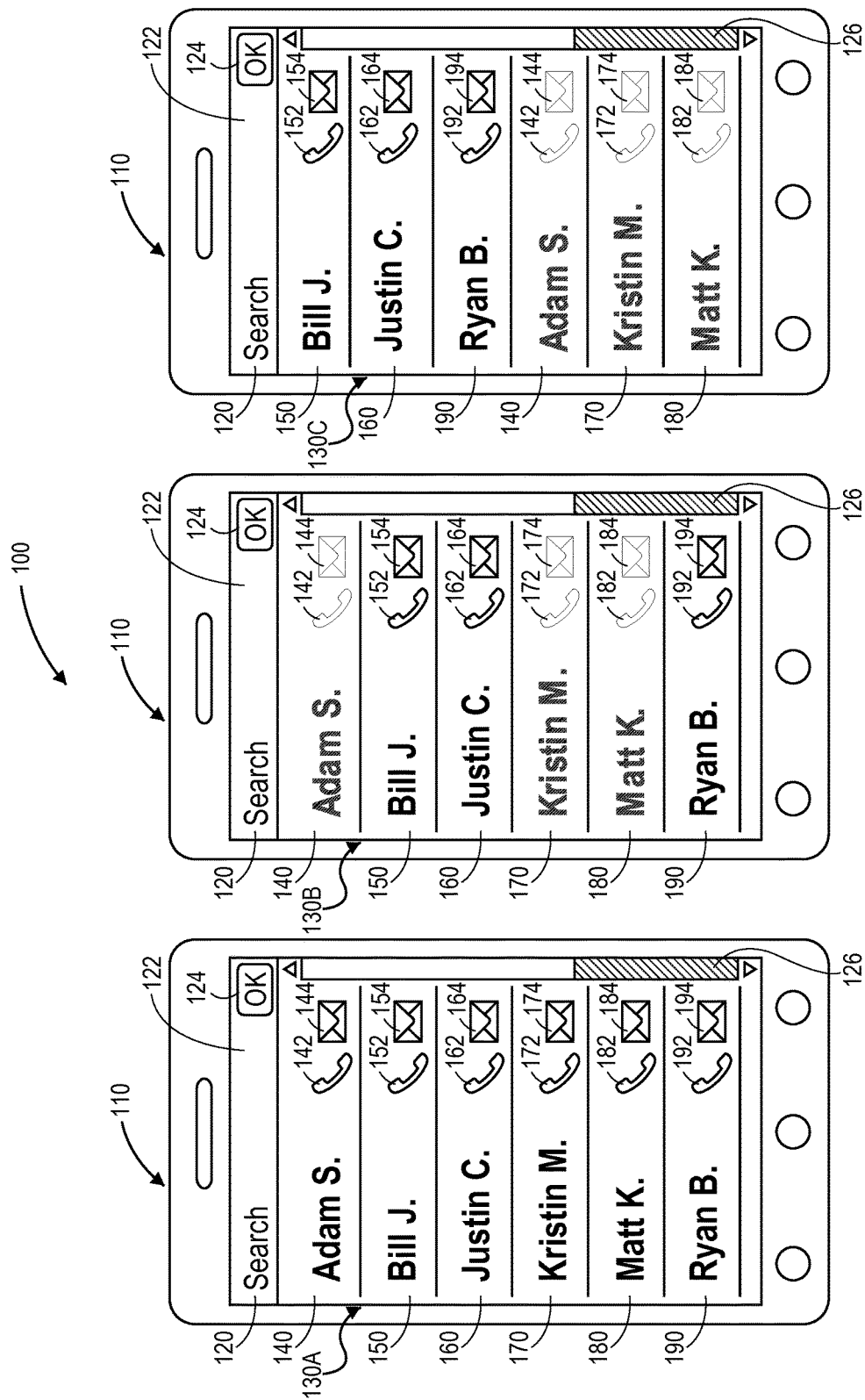
FIG. 1 shows an illustrative system for providing smart contact lists in accordance with embodiments of the present disclosure.

Referring to FIG. 1, a system 100 includes a smartphone 110 and a user interface 120. The user interface 120 includes a text box 122 and a selectable feature 124 for initiating a search based on one or more keywords or values entered into the text box 122. Additionally, as is shown in FIG. 1, the user interface 120 further includes a list 130A, 130B, 130C of a plurality of contacts 140, 150, 160, 170, 180, 190 at three different times. Each of the contacts 140, 150, 160, 170, 180, 190 in the contact list 130A includes a selectable feature 142, 152, 162, 172, 182, 192 for initiating a telephone call from the smartphone 110 and a selectable feature 144, 154, 164, 174, 184, 194 for initiating an E-mail message from the smartphone 110.

As is shown in FIG. 1, at a first time, the contact list 130A on the user interface 120 includes the contacts 140, 150, 160, 170, 180, 190 in a first predefined order, with the text associated with each of the contacts 140, 150, 160, 170, 180, 190 shown in a first aspect, viz., a first font and strength. At a second time, the contact list 130B on the user interface 120 includes the contacts 140, 150, 160, 170, 180, 190 in the first predefined order.

As is mentioned above, according to the systems and methods of the present disclosure, information regarding the various contacts shown in a contact list may be visually altered over time, such that contacts with which the user has had more recent contact are visually distinguished from contacts with which the user has had less recent contact. For example, the text or other information included in the contact list may be rendered in a first manner for contacts with which the user has more recently communicated, and in a second manner for contacts with which the user has less recently communicated. Therefore, as is shown in FIG. 1, at the second time, the text associated with the contacts 150, 160, 190 in the contact list 130B is shown in the first font and strength, while the text associated with the contacts 140, 170, 180 is shown in a second aspect, viz., a second font and strength, that is lighter and less prominent than the first font and strength of contacts 150, 160, 190.

Additionally, as is also mentioned above, the order in which the various contacts shown in a contact list may also be visually altered over time based on events of the user's behavior or activity, such that contacts with which the user has had more recent contact are displayed in a more prominent position than contacts with which the user has had less recent contact. Therefore, as also is shown in FIG. 1, at a third time, the contact list 130C within the user interface 120 is reordered to include the contacts 140, 150, 160, 170, 180, 190 in a second order that is different than the first predefined order. Specifically, according to the second order, the contacts 150, 160, 190 with which the user has more recently communicated are shown in an upper portion of the contact list 130C, while the contacts 140, 170, 180 with which the user has less recently communicated are shown in a lower portion of the contact list 130C.

Accordingly, as is shown in FIG. 1, the systems and methods of the present disclosure may rearrange or reconfigure a format in which a list of contacts or other files is to be displayed on a user interface based at least in part on the relevance of a contact to a user, as measured by the recency with which the user has communicated with the contact, or on any factor.

Many computer devices, or applications operating on such devices, permit a user to designate a list of his or her preferred contacts, e.g., individuals or entities with which the user prefers to communicate by way of a computer device or an application operating thereon. For example, a personal information management application that enables a user to send and receive E-mail messages may also permit the user to enter information regarding one or more of his or her contacts, e.g., in the form of a digital file or record, such as a variant call format (or .vcf) file, which includes the contacts' names, addresses, telephone numbers and/or E-mail addresses. When the user desires to send an E-mail to one or more of the contacts, the user can scroll through a list of the contacts generated based on the files or records, and select one of the contacts, thereby causing a message window of an E-mail client to be opened, with an E-mail address associated with the selected contact disposed within a recipient box.

Similarly, a telephone application or interface operating on a mobile computer device, e.g., a smartphone, may permit a user to record in a list a number of his or her contacts and their telephone numbers in one or more files or records maintained therein. When the user desires to speak with one or more of his or her contacts, the user may access a list of the contacts generated based on the files or records, and select one of the contacts (e.g., touch an area on a touchscreen corresponding to the contact), thereby causing a telephone call to be placed to the selected contact. Alternatively, the user may select one of the contacts and send a short or multimedia messaging service (SMS or MMS) text message to the selected contact.

As a user of a computer device expands his or her personal connections over time, a number of his or her telephone or E-mail contacts may also grow over time, such that a list of such contacts may become lengthy or unmanageable. This effect is compounded because users who obtain contact information regarding a connection frequently retain the contact information in a file or record maintained in a data store, regardless of whether the user has ever accessed the contact information or communicated with the connection, or will ever access the contact information or communicate with the connection again in the future, as users rarely filter or update their contacts in order to update outdated contact information, or to delete contact information that is no longer relevant.

Moreover, recent advancements in connectivity technologies have enabled computer users to synchronize their contacts across multiple applications and devices, or within network accounts. For example, a user's telephone contact lists and E-mail contact lists may often be combined into a single, diverse set of contacts that may be accessed from a single computer device. Similarly, sets of contacts that are associated with multiple devices (e.g., a smartphone and a laptop computer), or may be provided for multiple purposes (e.g., a "home" computer and a "work" computer), may also be combined into a single set of contacts. Further, contacts of multiple users that are associated with a single account (e.g., multiple phone numbers on a single cellular account, or multiple E-mail accounts on a single Internet service provider account) may also be combined into a single, master set.

Maintaining large sets of contacts, or combining contact sets, is helpful and convenient when access to a complete set of contact information for a variety of personal connections (e.g., professional, social or family) at any given time is desired. However, because users frequently tend to communicate with only a small portion of their connections on a regular basis, i.e., according to Pareto principles, lists of contacts generated based on such sets may become unmanageable or ineffective for their intended purposes. For example, because contact lists are frequently sorted on an alphabetical basis, a user who intends to communicate with a contact having a last name beginning with a letter that is at or near the end of the alphabet must scroll through some or all of his contacts in such a list in order to reach the contact's contact information. If the user frequently communicates with such a contact, the obligation to regularly scroll through large portions of such a list each time that the user intends to call or E-mail the contact, or to otherwise access the contact's contact information, may become unwieldy and time-consuming.

The systems and methods of the present disclosure are directed to automatically revising a format for displaying a list of information regarding one or more files, such as a list of contacts, based on a user's behavior or history regarding one or more of the files. For example, a format in which a plurality of contacts are to be displayed to a user in a list may be modified or adjusted based on whether the user has communicated with any of the contacts of late, or at all, or any other events that may be associated with the user and one or more of the contacts. The modified format may call for displaying information regarding contacts with which the user has communicated recently in a first aspect (e.g., a first font face, a first size, a first color or a first orientation), and displaying information regarding contacts with which the user has not communicated recently, or with which the user has communicated to varying degrees, in a second or further aspect (e.g., in one or more other font faces, sizes, colors or orientations).

Additionally, the modified format may call for displaying contacts in varying positions within a list based on whether, or to what extent, the user has communicated with each of a plurality of contacts. Moreover, the modified format may call for concealing or hiding one or more contacts from a list entirely based on a lack of behavior or activity by a user (e.g., an absence of any relevant events associated with a contact and a user, such as a telephone conversation or E-mail exchange) with regard to such contacts, or to otherwise display one or more contacts in accordance with a predetermined aspect (e.g., in a predetermined font, color, style or size), or at a predetermined rank or order in a list, regardless of whether the user has communicated with the contacts to any relevant degree. Subsequently, when a user requests to view a list of the contacts, the list may be displayed in accordance with the modified format, e.g., with the contacts displayed in one or more aspects or in a list having a particular order, which may bear some or no resemblance to a standard format for which the list was originally intended to be displayed (e.g., with a common aspect, or in an alphabetical order).

Additionally, the systems and methods may be used to customize the display of any type or form of information regarding one or more files of a set that are displayed in a list, in any manner, and are not limited to the display of contacts or contact information. For example, the systems and methods disclosed herein may be used to reorder or reconfigure the display of information regarding any kind or type of file, including not only contact information to be displayed in connection with a telephone client or personal information management software application but also bookmarks to one or more Uniform Resource Identifiers ("URI") or Uniform Resource Locators ("URL") stored in association with a browser, documents associated with a word processing application or spreadsheet application, lists of friends or personal connections of a user on a social network, or audio or video files to be played by a media playing application or device. In particular, the systems and methods disclosed herein may preferentially display the information in the list based on the relevance of any type of file to a user, or the recency with which the user has activated or accessed the files, based on events of a user's behavior or activity that may relate to one or more of the files. Moreover, the systems and methods of the present disclosure may further reorder or reconfigure the display of information regarding various types of files in a single list.

Additionally, those of ordinary skill in the pertinent arts will recognize that a list of files may be customized based on any type or number of events of behavior or activity observed in connection with one or more of the individual files. For example, with regard to a contact list maintained by a user, the various contacts in the list may be reordered or reconfigured based on the extent to which a user has communicated with such contacts by telephone or by E-mail, as well as by mail, by text message, or through a social network message or posting. Similarly, as another example, a list of media files that are accessible to a user may be reordered or reconfigured based on not only whether and when a user has accessed (e.g., listened to or viewed) such files, but also the portions of such files that were accessed (e.g., how much of the files were listened to or viewed) or any accompanying information or metadata regarding events associated with such access (e.g., times, dates or other characteristics of such events).

Moreover, the systems and methods of the present disclosure may identify or classify events of a user's behavior or activity regarding one or more files according to any qualitative or quantitative means. For example, the events of the user's behavior or activity may be considered in a binary respect, e.g., whether the user has accessed, or has not accessed, a given file during a defined period of time. Alternatively, events of the user's behavior or activity may be defined by a numerical nature, e.g., according to one or more scores or functions that represent an extent of the user's behavior or activity with a given file during a defined period of time. For example, an electronic communication (e.g., an E-mail) to or from a user on which a contact is a sender or a recipient may be treated differently, for the purpose of defining a function or calculating a score, than an electronic communication to which the user was merely copied (e.g., "CC-ed"). Further, the systems and methods disclosed herein may take any action based on a qualitative or quantitative assessment of one or more events of a user's behavior or activity with regard to a given file in accordance with the present disclosure, and such assessments may vary from user to user, or from file to file. The applications or uses for the various systems and methods disclosed herein are numerous and unlimited by any of the particular embodiments of such systems or methods described herein.

Figure 2:
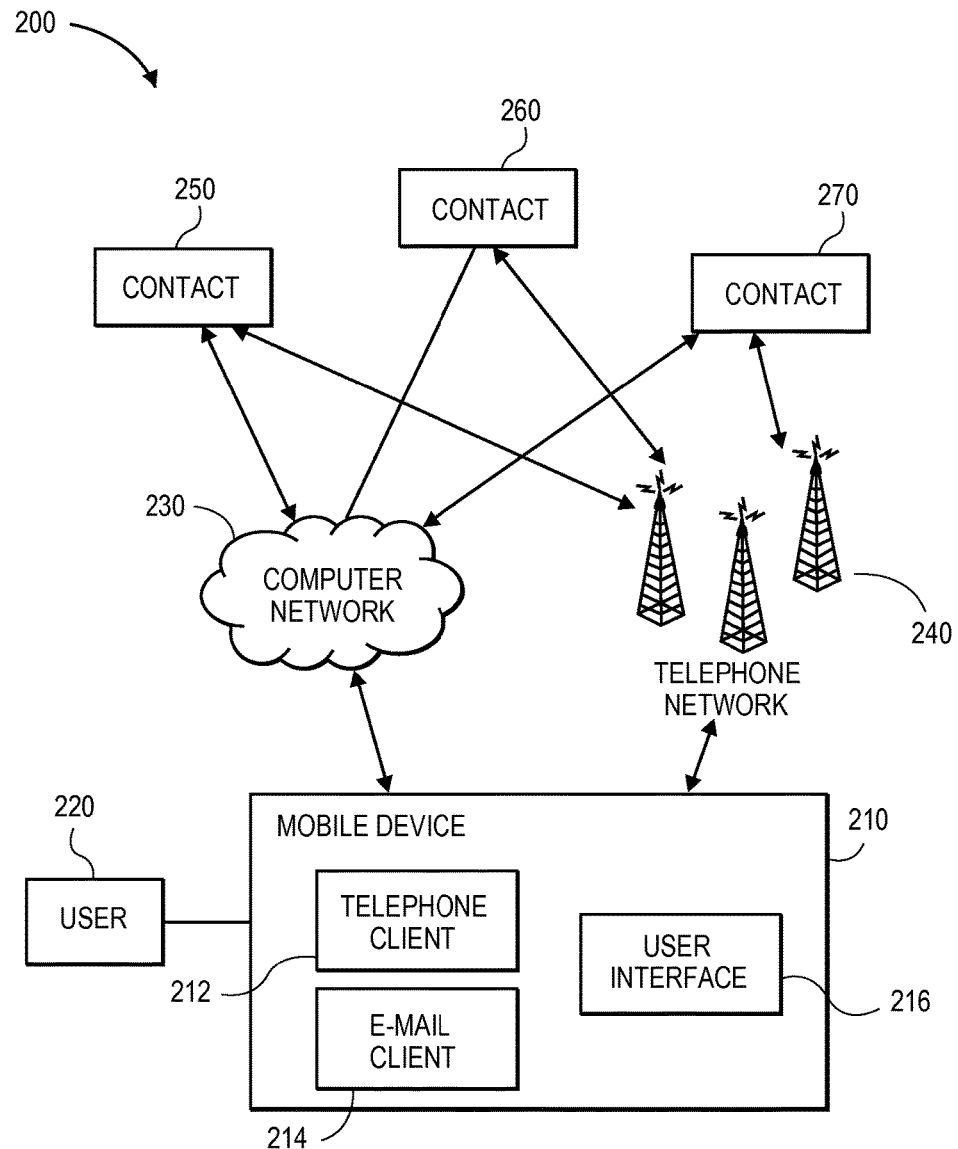
FIG. 2 is a block diagram of components of an illustrative system for providing smart contact lists in accordance with embodiments of the present disclosure.

Referring to FIG. 2, a block diagram of one system 200 for providing smart contact lists in accordance with embodiments of the present disclosure is shown. As is shown in FIG. 2, the system 200 includes a mobile device 210 that is operated by a user 220 and has access to a computer network 230, such as the Internet, as well as a telephone network 240. Using the mobile device 210, the user 220 may communicate with one or more contacts 250, 260, 270 over the computer network 230 or the telephone network 240.

The mobile device 210 may be any device that includes one or more hardware components that may be specifically programmed or adapted for performing a specific purpose, or a general purpose device including but not limited to a desktop computer, a laptop computer, a tablet computer, a personal digital assistant, a digital media player or a smartphone, and may include any form of input and/or output peripherals or accessories such as scanners, readers, keyboards, keypads, touchscreens or pointing devices. The mobile device 210 may also be provided in connection with various other components or apparatuses, such as automobiles, wristwatches, home appliances, industrial machinery or the like. Additionally, the mobile device 210 may be provided in a fixed location or may be portable, and may even be worn on a human body. Moreover, the mobile device 210, or any other like machines utilized by the user 220 or by other users (not shown) may be connected to or otherwise communicate with the contacts 250, 260, 270 over either the computer network 230 or the telephone network 240, by the transmission and receipt of digital or analog data of any type or form.

As is shown in FIG. 2, the mobile device 210 includes a telephone client 212, an E-mail client 214 and a user interface 216. The telephone client 212 may be any application or module that enables the user 220 to operate the mobile device 210 to communicate with one or more other users of other similarly enabled devices, such as the contacts 250, 260, 270, or any other users (not shown), through the exchange of digital or analog data of any type or form over the telephone network 240. For example, the telephone client 212 may allow the user 220 to speak with the contacts 250, 260, 270 or other users who may operate a traditional landline telephone, a cellular telephone, a Voice over Internet Protocol (or "VoIP") telephone or telephonic application or any other form of audio or video communication services across the telephone network 240.

Furthermore, those of ordinary skill in the pertinent arts will recognize that the mobile device 210 may be configured to transfer digital or analog information to the contacts 250, 260, 270, or to other individuals, entities or computer devices, over the computer network 230 by way of the telephone client 212, e.g., according to the Wireless Application Protocol (or "WAP") or other technical standard, or to transmit or receive one or more SMS or MMS messages. The telephone client 212 may further enable the user 220 to generate, store or edit a list of information regarding one or more contacts, such as the contacts 250, 260, 270, that may be accessed using the mobile device 210. For example, the list of contacts may include a name of a contact, as well as a telephone number or other identifier by which the contact may be reached (e.g., a telephone number or a user name for a VoIP or other telephonic system), as well as an address, an E-mail address or any other personal information regarding the contact (e.g., a birthdate, an anniversary, or names of spouses or children). The telephone client 212 may access such a list of contacts during normal operations.

The E-mail client 214 may be any application or module that enables the user 220 to communicate with one or more other users of other similarly enabled devices, such as the contacts 250, 260, 270, or any other users (not shown), through the exchange of electronic messages comprising digital or analog data of any type or form over the computer network 230 or the telephone network 240. For example, the E-mail client 214 may enable the user 220 to draft, save, send, receive, archive or delete any type or form of electronic messages, including not only E-mails but also SMS or MMS text messages and any like exchanges of information. Additionally, as with the telephone client 212, the E-mail client 214 may enable the user 220 to generate, store or edit a list of information regarding one or more contacts, such as the contacts 250, 260, 270, that may be accessed using the mobile device 210, and such a list of contacts may be accessed by the E-mail client 214 during normal operation.

According to some embodiments, the telephone client 212 or the E-mail client 214 may be provided as a portion or subset of a personal information management application that further permits a user to maintain a calendar, a list of tasks, notes or other information. Moreover, the telephone client 212 and the E-mail client 214 may maintain a single, common list of contacts, or discrete lists of contacts, in accordance with the present disclosure.

The user interface 216 may be any form of visual interactive display feature or means that permits the user 220 to interact with the mobile device 210. The user interface 216 may be graphical in nature, and provided by one or more software applications operating on the mobile device 210, such as the telephone client 212 or the E-mail client 214. The user interface 216 may comprise any number of graphical controls or elements such as menu bars; tools or tool bars; windows or other displays in fixed or adjustable positions; or buttons, icons or other interactive elements which permit the user 220 to manipulate or control any aspect of the mobile device 210 or any software applications operating thereon. Typically, a user interface 216 is rendered upon a computer display provided in connection with the mobile device 210. Such computer displays may have any size or shape, including but not limited to displays as small as a face of a wristwatch or an optical element of a pair of glasses, or as large as a ribbon board mounted in a stadium or arena. Such computer displays may take the form of cathode ray tube screens, light-emitting diode screens, liquid-crystal display screens, touchscreens (e.g., capacitive or resistive) and the like, as well.

The computer network 230 and the telephone network 240 may comprise any type or form of hardware required in order to enable communication with or between the mobile device 210 or the user 220 and the contacts 250, 260, 270 or any other users or contacts (not shown). For example, the infrastructure of the computer network 230 may include any number of servers, routers, exchange points, switches or switching equipment that may be required in order to facilitate the transfer of digital or analog data between two or more networked computer machines. Similarly, the infrastructure of the telephone network 240 may include any number of public switched telephone networks, base stations or towers, control equipment, interface equipment, switching offices or subscriber units.

The contacts 250, 260, 270 may be any individuals or entities with which the user 220 may be associated, including not only friends, family members, colleagues or associates but also businesses, organizations or government agencies, or any other like individuals or entities. Such contacts 250, 260, 270, or other contacts, may access the computer network 230 or the telephone network 240 using any type or form of telephonic machine or computer device that may be known to those of ordinary skill in the pertinent arts. Additionally, information regarding the contacts 250, 260, 270, or other contacts, may be maintained in a list or other record, such as a contact list that may be stored in association with the telephone client 212, the E-mail client 214 or in one or more other internal or external data stores (not shown), as described above. Such a contact list may enable the user 220 to initiate a communication session with one or more of the contacts 250, 260, 270 by way of the mobile device 210, such as by the activation of one or more selectable features associated with one of the contacts 250, 260, 270 as displayed on the user interface 216.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. Also, those of skill in the pertinent art will recognize that the user 220, or other users (not shown), may use a keyboard, keypad, mouse, stylus, touch screen, or other device (not shown) or method for interacting with the mobile device 210 or any software applications operating thereon, or to "select" an item, link, node, hub or any other aspect of the present disclosure. Moreover, process elements described as being performed by a "computer device," an "analytical engine," or a "rendering engine," or like terms, may be automated elements performed by their respective computer systems or devices, or implemented within software applications or modules (or computer programs) executed by one or more computer systems or devices. Specially designed hardware could, alternatively, be used to perform certain operations.

For example, the user 220 may use any software, network-enabled or network applications operating on the mobile device 210, such as a web browser or any other client-server applications (e.g., dedicated shopping applications or other software) or features including E-mail messages, short or multimedia messaging service (SMS or MMS) text messages, social networking messages or postings, or other messaging techniques to communicate with (or connect to) one or more other computer devices through the computer network 230 or the telephone network 240. In addition to the mobile device 210, computing devices utilized by customers in accordance with the present disclosure may be any of a number of computer-related devices that are capable of communicating over the computer network 230 or the telephone network 240, including but not limited to set-top boxes, personal digital assistants, digital media players, network pads, desktop computers, televisions, automobile entertainment systems, appliances, gaming consoles or controllers, electronic book readers, and the like. Similarly, display screens of the mobile device 210, or of other computer devices, may take any form, e.g., cathode ray tubes screens, light-emitting diode screens, liquid-crystal display screens, touchscreens and the like.

The protocols and components for providing communication between the mobile device 210 and/or any software applications operating thereon, the computer network 230 or the telephone network 240, or any of the contacts 250, 260, 270 are well known to those skilled in the art of computer and telephonic communications and thus, need not be described in more detail herein.

The data and/or computer executable instructions, programs, firmware, software and the like (also referred to herein as "computer executable" components) described herein may be stored on a non-transitory computer-readable medium that is within or accessible by the mobile device 210, the computer network 230, the telephone network 240, or the contacts 250, 260, 270 and having sequences of instructions which, when executed by a processor (such as a central processing unit, or CPU), cause the processor to perform all or a portion of the functions and/or methods described herein. Such computer executable instructions, programs, software and the like may be loaded into the memory of the mobile device 210, the computer network 230, the telephone network 240, or the contacts 250, 260, 270 using a drive mechanism associated with the non-transitory computer readable medium, such as a floppy drive, CD-ROM drive, DVD-ROM drive, network interface, or the like, or via external connections.

Some embodiments of the systems and methods of the present disclosure may also be provided as a computer executable program module including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read only memories (EPROMs), electrically erasable programmable read only memories (EEPROMs), flash memory, magnetic or optical cards, solid-state memory devices, or other types of media/machine-readable medium that may be suitable for storing electronic instructions.

For the purposes of illustration, some of the systems and methods disclosed herein may be referenced primarily in the context of providing lists of information regarding one or more contacts of a user having a format that may be modified or altered based at least in part on any behavior or activity of the user with regard to one or more of the contacts. As will be recognized by those of skill in the art, however, the systems and methods disclosed herein may also be used in many other situations, and with regard to any type of software application or computer device (e.g., bookmarks maintained by a web browser, audio or video files accessible to a media player, or any other type or form of computer-based file), and are not limited to any of the embodiments described herein.

Figure 3:
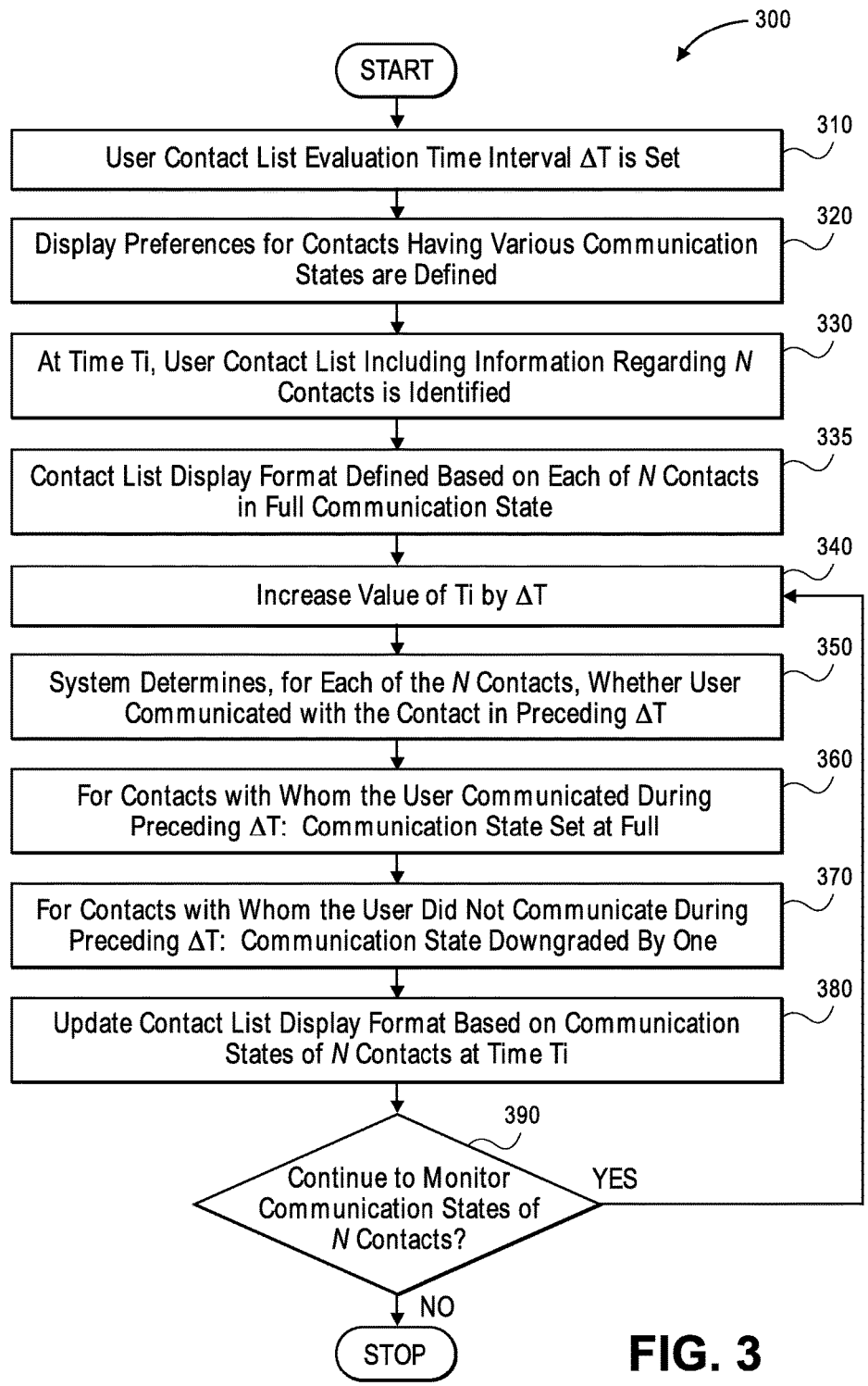
FIG. 3 is a flow chart of an illustrative process for providing smart contact lists in accordance with embodiments of the present disclosure.

As is discussed above, the systems and methods of the present disclosure may provide lists of contacts or other files that may be customized or configured based on any available information regarding events of a user's behavior or activity with regard to one or more of the contacts or other files. The presentation of information regarding the contacts or other files in a list may be defined according to a state or level of communication between the user and a contact, or a state or level of behavior or activity by the user with a file. Referring to FIG. 3, a flow chart 300 of one illustrative process for providing smart contact lists in accordance with embodiments of the present disclosure is shown.

At box 310, a user contact list evaluation time interval $\Delta T$ is set. The time interval $\Delta T$ defines the frequency or regularity with which elements of a user's behavior or activity with one or more contacts may be determined. At box 320, the display preferences for contacts having various communication states are defined. For example, such preferences may identify a font, color, style or size of text or other information relating to contacts of a set that are at a full level of communication, e.g., contacts with which the user has frequent contact. The preferences may further identify fonts, colors, styles or sizes of text or other information relating to contacts in the set that are at a less than full level of communication, e.g., contacts which the user has infrequent contact, or contact with varying degrees of frequency. The display preferences may define any number of levels of communication between a user and one or more contacts. Additionally, the preferences may define a period of time or a number of time intervals that may elapse before a contact list is reordered or reconfigured or, alternatively, a period of time or number of time intervals by which a contact will be removed from a set. Alternatively, for lists of information other than contacts, display preferences may be defined for various states or levels of access or utilization.

At box 330, beginning at time Ti, a user contact list including information regarding a plurality of n contacts is identified. The list may include names of each of the n contacts, as well as any available telephone numbers (e.g., home, mobile, work or fax), E-mail addresses (e.g., personal or work), relevant web addresses, street addresses or any other relevant information. At box 335, a contact list display format is defined based on each of the n contacts in a full communication state. For example, the display format defined at box 335 may be defined with the presumption that the user frequently and regularly communicates with each of the contacts in the list. In this regard, where the contacts are treated as having an equal or common communication state with the user, the contacts may be sorted according to a display format that is defined based on some factor other than the communication state, e.g., a default ranking or ordinal basis, such as alphabetical order.

At box 340, the time Ti is incrementally advanced by the user contact list evaluation time interval $\Delta T$, and at box 350, a system determines, for each of the n contacts, whether the user has communicated with the contact in the preceding time interval $\Delta T$. For example, the system may track a log or list of events associated with the user's communication behavior or activity by standard, traditional means such as telephone or E-mail, e.g., the telephone client 212 or the E-mail client 214 of the system 200 of FIG. 2, or communications by non-traditional or other means including a record of "snail mail" letters sent to or received from such contacts, as well as SMS or MMS text messages or one or more messages or postings made on behalf of the user on a social network.

At box 360, for contacts with which the user communicated during the previous time interval ΔT, the communication state with such contacts may be set at full, regardless of the amount of time that may have elapsed since the user's last communication with such contacts prior to the previous interval ΔT. At box 370, for contacts with which the user did not communicate during the preceding time interval ΔT, the communication state may be downgraded by one level.

At box 380, the contact list display format is updated based on the communication states of the n contacts that were identified at time Ti. For example, where the display preferences would display contacts that are at a full level of communication in a first aspect, e.g., a first font, color, style or size of text (e.g., Arial, black, bold or 24 point), the contact list display format may be updated to call for the display of such contacts which remained at the full level of communication, or achieved the full level of communication in the preceding time interval ΔT, in accordance with the display preferences. The contact list display format may also be updated to call for the display of contacts having communication states at less than the full level accordingly, as well. For example, where a number of communication states have been defined for a set of contacts, the aspects with which contacts of each set are to be displayed may be selected based on the extent of the user's behavior or activity with regard to the contacts of the set. Contacts with which the user frequently communicates may be assigned higher order communication states, and may be displayed in stronger fonts, more prominent colors, more emphatic styles or larger sizes, than contacts with which the user does not frequently communicate, which may be assigned lower order communication states, or displayed in weaker fonts, less prominent colors, less emphatic styles or smaller sizes.

Furthermore, a contact list display format may be updated to reorder the one or more contacts included in the list based at least in part on the communication states of the n contacts, such as by elevating the ranking or listing of contacts in a relatively high order communication state (e.g., contacts with which the user frequently communicates), and downgrading the ranking or listing of contacts in a lower order communication state (e.g., contact with which the user does not regularly communicate, or with which the user has not recently communicated).

At box 390, the system determines whether the monitoring of the communication states of the remaining n contacts should continue. If the monitoring of the communication states is to continue, then the process returns to box 340, where the value of the time Ti is again incrementally advanced by the user contact list evaluation time interval ΔT. If the monitoring of the communication states is no longer required, then the process ends.

Accordingly, the systems and methods of the present disclosure may customize a display format for a list of contacts of a user, or other files accessed by the user, based on the extent and frequency of the communication behavior or activity between the user and the contacts, or the use of such files by the user. The display format may call for displaying the list in a manner that distinguishes contacts with which the user regularly communicates from those with which the infrequently communicates, or files that the user regularly accesses from files that the user does not regularly access. In this regard, the display format may call for the display of information regarding such contacts, or such files, in any font, color, style or size that would distinguish information such contacts or files from one another, and in an order that may be reconfigured to reflect variations or differences in frequency of communication or access.

Figure 4:
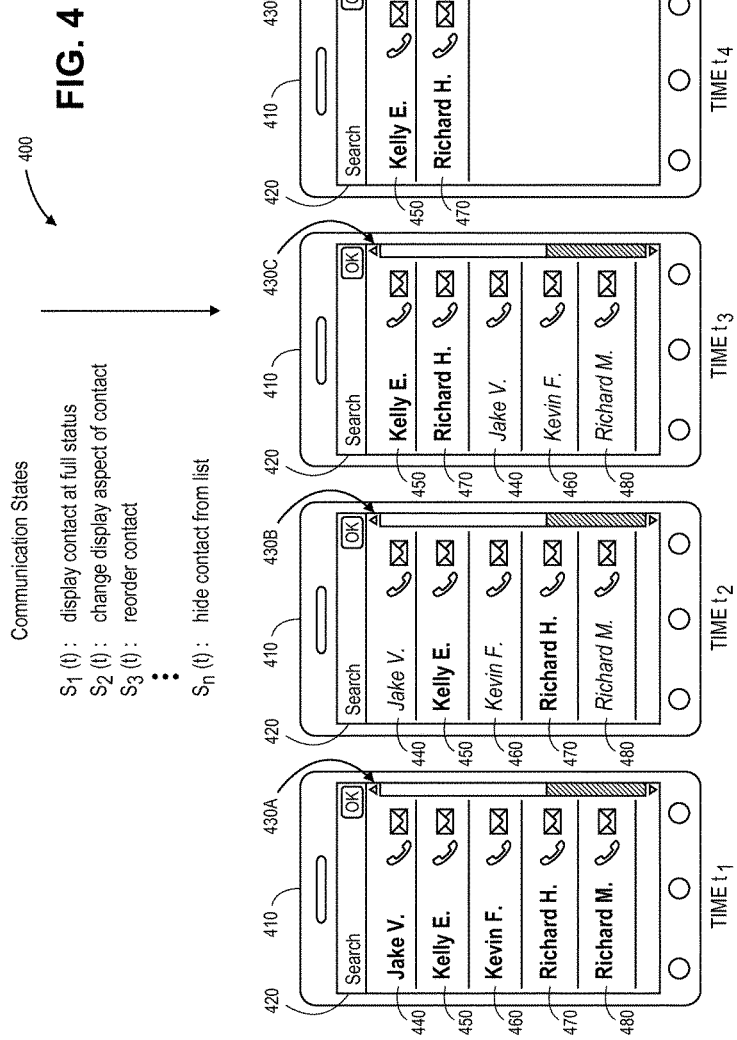
FIG. 4 is a presentation of data for providing smart contact lists in accordance with embodiments of the present disclosure.

Referring to FIG. 4, the varying states 400 of communication with contacts 440, 450, 460, 470, 480, and the display of contact lists 430A, 430B, 430C, 430D on a user interface 420 of a mobile device 410, are shown as functions of time. Except where otherwise noted, reference numerals preceded by the number "4" shown in FIG. 4 indicate components or features that are similar to components or features having reference numerals preceded by the number "1" shown in FIG. 1.

As is shown in FIG. 4, the states 400 of communication include a full state of communication $s_1(t)$ for which a contact should be prominently or optimally displayed in a full status, e.g., in a strong font, a prominent color, an emphatic style or a large size, as well as lesser states of communication $s_2(t)$, $s_3(t)$, $s_4(t)$, for which the display aspects of such contacts should be changed, or for which the contacts should be reordered or hidden, respectively, are shown.

Additionally, the contact lists 430A, 430B, 430C, 430D shown on the user interface 420 of the mobile device 410 are arranged according to various display formats at various times $t_1$, $t_2$, $t_3$, $t_4$ based on the respective communication states $s_1(t)$, $s_2(t)$, $s_3(t)$, $s_4(t)$ of each of the contacts 440, 450, 460, 470, 480. For example, at time $t_1$, the contact list 430A includes the contacts 440, 450, 460, 470, 480 in alphabetical order, with each of the contacts shown with an aspect in common (e.g., bold style), corresponding to each of the contacts in a full state of communication $s_1(t)$. At time $t_2$, the contact list 430B includes the contacts 440, 450, 460, 470, 480 in an unaltered order as compared to the contact list 430A, but with the contacts 450, 470 shown in their original aspect, e.g., according to the full state of communication $s_1(t)$, and with the contacts 440, 460, 480 shown in a common aspect (e.g., italics) that is less pronounced than the aspect of the contacts 450, 470, e.g., according to a second state of communication $s_2(t)$. The difference between the aspects of the contacts 450, 470 and the aspects of the contacts 440, 460, 480 indicates that the user has had more frequent communications recently with the contacts 450, 470 and less frequent communications with the contacts 440, 460, 480, during the interval between time $t_1$ and time $t_2$.

At time $t_3$, the contacts 440, 450, 460, 470, 480 in the contact list 430C have been reordered, as compared to the order in which the contacts 440, 450, 460, 470, 480 are displayed in the contact list 430A and the contact list 430B. Specifically, the contacts 450, 470 with which the user has had more frequent communications recently are shown in their original aspect at a top of the contact list 430C, according to the full state of communication $s_1(t)$, while the contacts 440, 460, 480 with which the user has had less frequent communications have been reordered toward a bottom of the contact list 430C, e.g., according to a third state of communication $s_3(t)$.

Finally, at time $t_4$, the contacts 450, 470 are shown in the contact list 430D alone, e.g., again in the full state of communication $s_1(t)$. The contacts 440, 460, 480, however, are not displayed in the contact list 430D, e.g., according to a fourth state of communication $s_4(t)$.

Accordingly, by determining a state of communication between a user and one or more contacts of the user, or a number or type of events associated with communications between the user and the one or more contacts of the user, a display format by which such contacts are to be shown in a list may be customized. For contacts with which the user regularly and frequently communicates, the display format may call for information regarding such contacts to be displayed in a clear and prominent manner, and for such information to be listed at a top or upper portion of the list. Conversely, information regarding contacts with which the user does not regularly communicate, or communicates less frequently, may be displayed in a less prominent manner, or at a bottom or lower portion of the list, or withheld from the list altogether.

As is discussed above, a state of communications between a user and one or more contacts may be defined according to any qualitative or quantitative means, and decisions regarding the prominence with which information regarding such contacts is displayed, or the placement of such information in a list, may be made based on a qualitative or quantitative value assigned to a state of communications for each contact in a set. For example, a display score function may be derived for one or more contacts in a set, and a display format for displaying the contacts of the set in a list may be defined based on the respective display scores for each of the contacts. The display score functions may modify a display score for each of a user's contacts in a consistent manner, or may modify each such score independently, and different display score functions may be derived and applied to the various contacts of different users.

Figure 5:
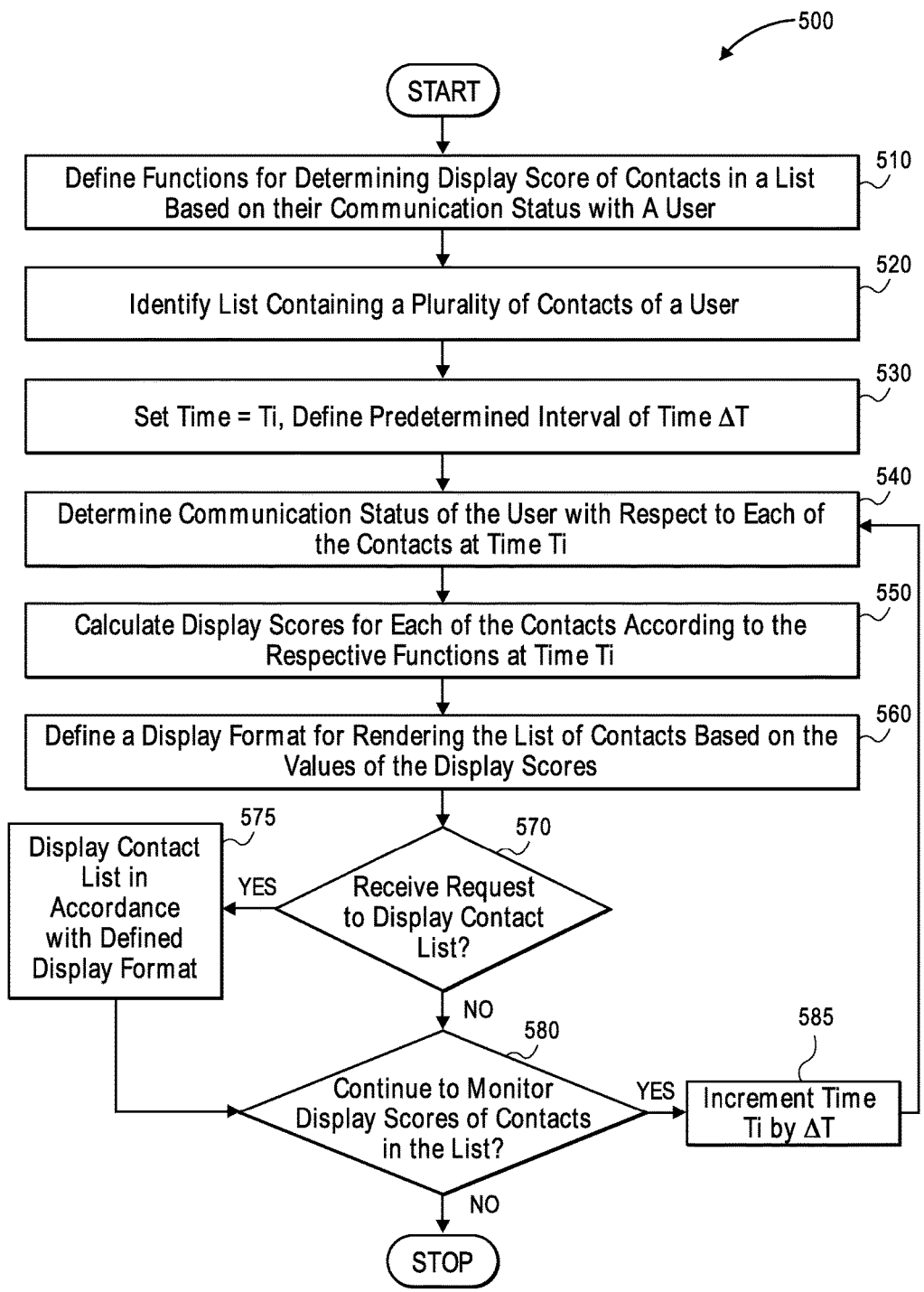
FIG. 5 is a flow chart of an illustrative process for providing smart contact lists in accordance with embodiments of the present disclosure.

Referring to FIG. 5, a flow chart 500 of one illustrative process for providing smart contact lists in accordance with embodiments of the present disclosure is shown. At box 510, functions for determining display scores for contacts in a list based on their communication status with a user are defined. As is discussed above, a single display score function may be derived for all of a user's contacts, or for one or more contacts individually. Further, display score functions may be derived for the purpose of determining display scores for contacts of a number of users, or for determining display scores for contacts of a specific user.

At box 520, a list containing a plurality of contacts of a user is identified. At box 530, an initial time Ti is set, and a predetermined time interval ΔT corresponding to a frequency or regularity with which a user's behavior or activity with one or more contacts is determined may be defined. At box 540, the communication status of the user with respect to each of his or her contacts is determined. For example, a log or a list of communication events between the user and one or more of the contacts (e.g., telephone calls, E-mail or text messages, social network postings or messages, or any other type or form of communication) may be consulted, and the extent or frequency of such events with each of the contacts in the list may be ascertained thereby.

At box 550, the display scores for each of the contacts in the list are calculated according to the respective display score functions at time Ti. Such functions may be linear, quadratic or hyperbolic in nature, or take any other form, and may consider any type of communication event or means between the user and each of his or her contacts (e.g., telephone, E-mail, SMS or MMS text message, "snail mail" or social networking). Alternatively, such functions may apply one or more machine learning algorithms or statistical methods, such as Bayes' theorem, to determine the significance of various communication events occurring between a user and a contact.

At box 560, a display format for rendering a list of the contacts based on the values of their respective display scores is determined. For example, the display format may call for displaying information regarding contacts having display scores that are above a first threshold in strong fonts, bright colors, bold styles or large sizes, and displaying information regarding contacts having display scores that are below the first threshold, or above a second threshold, in different fonts, colors, styles or sizes. Alternatively, the display format may call for reordering or relocating a contact within a list when a display score corresponding to the contact rises above or falls below a given threshold. The respective display scores may be calculated, and the display format may be determined based on such display scores, on an automatic basis in real time or in near-real time with regard to one or more contacts, or at a predetermined time or in accordance with a predetermined schedule for multiple contacts. The calculations of display scores and determinations of display formats may be executed singly or in one or more batch processes, as well.

At box 570, a system determines whether a request to display a contact list has been received from the user. For example, such a request may be made by an interaction with a user interface rendered on a display of a computer device, e.g., by a selection of a button or icon associated with a telephone client or an E-mail client on a touchscreen of a smartphone, such as is shown on the user interfaces 120 of the smartphone 110 of FIG. 1, or by a mouse-click on an icon or link associated with a personal information management software application operating on a desktop computer or laptop computer.

If such a request to display a contact list is received, then the process advances to box 575, where the contact list is displayed according to the defined display format. For example, where the display format calls for displaying contacts in select fonts, colors, styles or sizes according to their display scores, the list may be displayed in accordance with the display format based on the most recently calculated display scores for such contacts. Alternatively, where a display format calls for displaying contacts of the list in a select order, or modifying an order in which such contacts are displayed, based on their respective display scores, the contacts may be displayed in an order defined by the display format according to the most recently calculated display scores for such contacts.

If no request to display the contact list is received at box 570, or after the contact list has been displayed in accordance with the display format at box 575, the process advances to box 580, where the system determines whether the display scores of the contacts in the list are to be monitored. If the monitoring of the display scores is desired, then the process advances to box 585, where the value of the time Ti is incrementally advanced by the predetermined interval of time ΔT before returning to box 540. If the monitoring of the display scores is no longer desired, then the process ends without further modifying the defined display format.

Accordingly, the systems and methods of the present disclosure may derive one or more qualitative or quantitative means for determining a display format for presenting information to a user regarding one or more contacts or files based on the respective levels of behavior or activity between the user and one or more of the individual contacts or files. The display format may define where and how a contact or a file should be represented in a list displayed to a user, and if or when the list should be modified, based on one or more qualitative or quantitative display scores. Further, the calculations of display scores, and the determinations of display formats, may occur at any time and according to any schedule, such that the systems and methods are readily equipped to present a list of information regarding contacts or files in the most appropriate format to a user upon the user's request.

Figure 6:
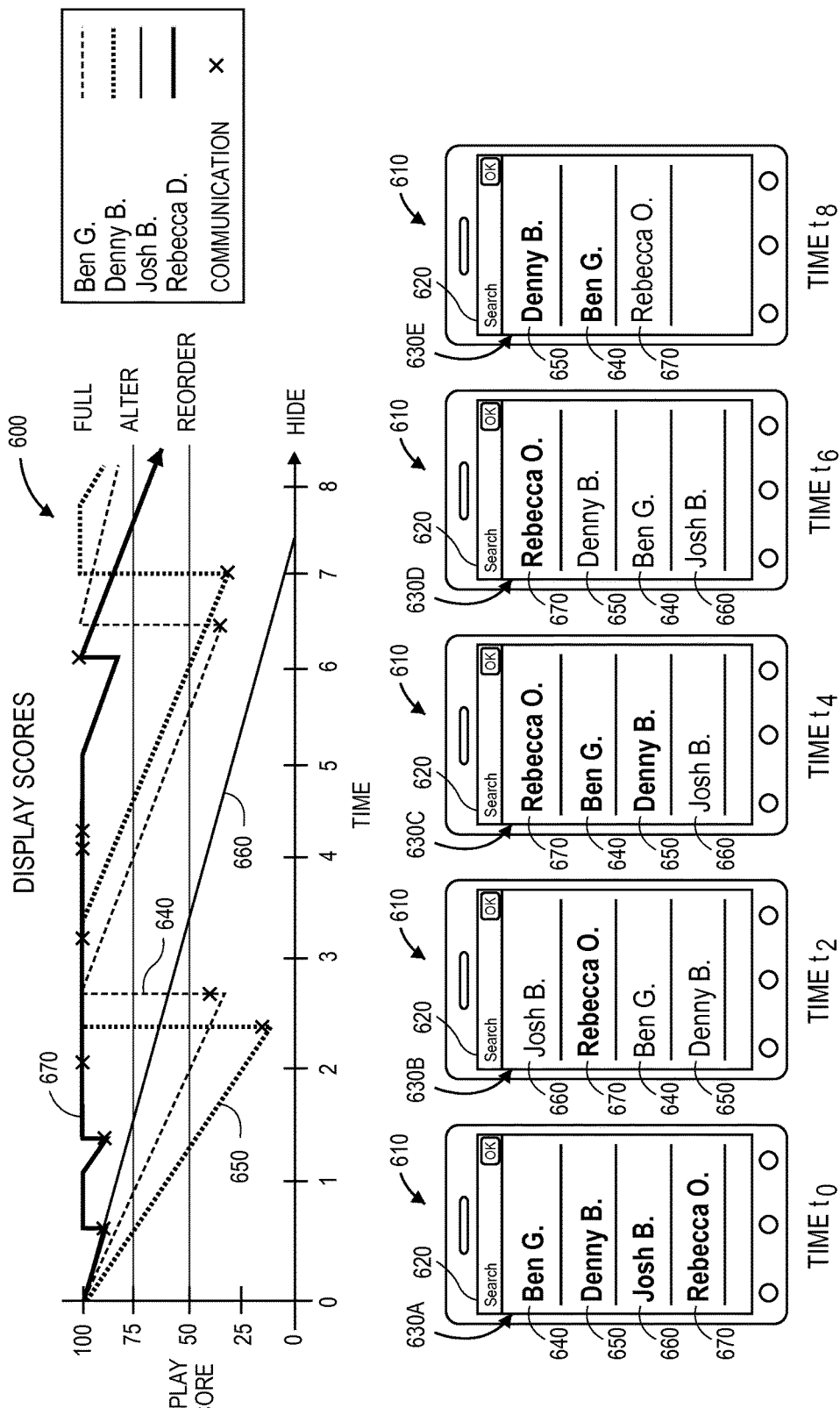
FIG. 6 is a presentation of data for providing smart contact lists in accordance with embodiments of the present disclosure.

The customization of a display format based on a display score that is defined according to user behavior or activity is shown in FIG. 6. Referring to FIG. 6, a plot 600 of values of display scores 600 over time, from time $t_0$ to $t_8$, for contacts 640, 650, 660, 670 is shown. Except where otherwise noted, reference numerals preceded by the number "6" shown in FIG. 6 indicate components or features that are similar to components or features having reference numerals preceded by the number "4" shown in FIG. 4 or by the number "1" shown in FIG. 1.

As is shown in FIG. 6, the plot 600 further includes markers (e.g., letters "X") indicating when the user communicated with each of the contacts 640, 650, 660, 670. Additionally, a smartphone 610 including a user interface 620 having contact lists 630A, 630B, 630C, 630D, 630E displayed thereon at times $t_0$, $t_2$, $t_4$, $t_6$, $t_8$ is also shown.

As is shown in FIG. 6, the values of the display scores for each of the contacts 640, 650, 660, 670 are set at a nominal original level (viz., 100) at time $t_0$. Thereafter, the values of the corresponding display scores begin to degrade according to their respective display score functions, and return to their nominal levels upon a communication between the user and one of the contacts 640, 650, 660, 670, as is indicated by a marker.

Thus, at time $t_0$, the display list 630A includes the information regarding the contacts 640, 650, 660, 670 displayed in an original, native order (e.g., alphabetical) that bears no relation to the communications between the user and the respective contacts 640, 650, 660, 670 over time. Additionally, as is also shown in FIG. 6, the information regarding each of the contacts 640, 650, 660, 670 is shown in the display list 630A in a common font and style at time $t_0$.

At time $t_2$, the display list 630B includes the contact 670 in the original font and style of the contact list 630A, and the contacts 640, 650, 660 in a lighter and less pronounced font and style. Additionally, the contact 660 is shown at a top or upper portion of the user interface 620, while the contacts 640, 650 are shown at a bottom or lower portion of the user interface 620. The change in the font and style of the contacts 640, 650, 660 in the contact list 630B, and the relocation of the contacts 640, 650 to the bottom or lower portion of the user interface 620, are determined based on the values of their respective display scores at time $t_2$. For example, as is shown in the plot 600, between time $t_0$ and $t_2$, the user communicated with the contact 670, but did not communicate with the contacts 640, 650, 660.

At time $t_4$, the display list 630C includes not only the contact 670 but also the contacts 640, 650 in the original font and style of contact list 630A. The display list 630C also includes the contact 660 displayed in the lighter, less pronounced font and style. The change in the font and style of the contacts 640, 650 in the contact list 630C, and the relocation of the contact 660 to the bottom or lower portion of the user interface 620, are determined based on the values of their respective display scores at time $t_4$, which, as is shown in the plot 600, remained constant for contact 670 but continued to decrease for contacts 640, 650, 660. For example, between time $t_2$ and $t_4$, the user communicated with the contacts 670, 640, 650 but did not communicate with the contact 660.

At time $t_6$, the display list 630D includes the contact 670 in the original font and style of contact list 630A, and the contacts 640, 650, 660 in the lighter, less pronounced font and style. The change in the font and style of the contacts 640, 650 are based on the values of their respective display scores at time $t_6$. For example, as is shown in the plot 600, between time $t_4$ and $t_6$, the user communicated with the contact 670, but did not communicate with the contacts 640, 650, 660. Finally, at time $t_8$, the display list 630E includes the contacts 650, 640 in the original font and style, and the contact 670 in the lighter, less pronounced font and style. Additionally, the contact 660 has been hidden from the contact list 630E. The change in the font and style of the contacts 640, 650, 670, and the removal of the contact 660, are based on the values of their respective display scores at time $t_8$, as shown in the plot 600.

Accordingly, a display format for a contact list, or for a list of other files, may be defined based on values of display scores for the contacts or the other files to be included in the list, which may be determined according to one or more functions over time. The functions may be defined on any basis, and may consider the level or extent of the user's behavior or activity with regard to one or more contacts or files, e.g., whether the user has engaged in any communication events with each of the contacts in the list, or how frequently such events have occurred.

Figure 7:
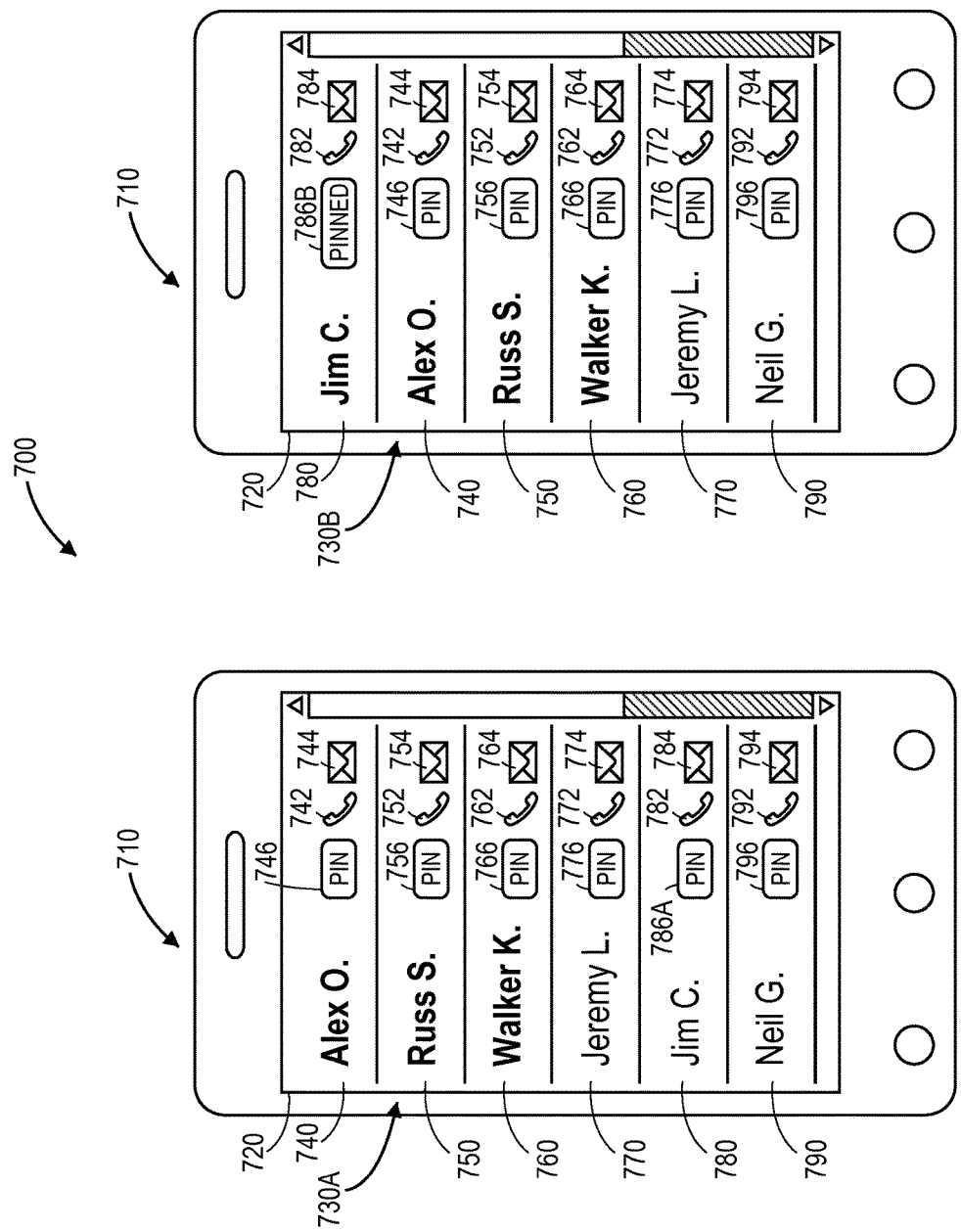
FIG. 7 shows an illustrative system for providing smart contact lists in accordance with embodiments of the present disclosure.

Additionally, the systems and methods of the present disclosure may also permit a user to suspend the operation of a display score function regarding a selected file, and maintain the file on a contact list in general, or in a specific position, configuration or display format, regardless of the level or extent of behavior or activity with regard to the selected file. Referring to FIG. 7, one illustrative system 700 for providing smart contact lists in accordance with embodiments of the present disclosure. Except where otherwise noted, reference numerals preceded by the number "7" shown in FIG. 7 indicate components or features that are similar to components or features having reference numerals preceded by the number "6" shown in FIG. 6, by the number "4" shown in FIG. 4 or by the number "1" shown in FIG. 1.

As is shown in FIG. 7, the system 700 including a smartphone 710 and a user interface 720 associated with contact lists 730A, 730B of a plurality of contacts 740, 750, 760, 770, 780, 790 at two different times is shown. Each of the contacts 740, 750, 760, 770, 780, 790 in the contact list 730A includes a selectable feature 742, 752, 762, 772, 782, 792 for initiating a telephone call from the smartphone 710 and a selectable feature 744, 754, 764, 774, 784, 794 for initiating an E-mail message from the smartphone 710. Additionally, each of the contacts 740, 750, 760, 770, 780, 790 in the contact list 730A also includes a selectable feature 746, 756, 766, 776, 786A, 796 for pinning a contact to the contact list 730A, or otherwise precluding a contact from being modified, relocated or removed from the contact list 730A on any basis. For example, once one of the selectable features 746, 756, 766, 776, 786A, 796 is selected by the user, the corresponding one of the contacts 740, 750, 760, 770, 780, 790 will remain in the list, e.g., in a fixed or variable position, within the user interface 720 or any contact list displayed thereon until the selectable feature 786B is selected again.

The contact list 730B is shown following the selection of the selectable feature 786A, which causes the corresponding contact 780 to be relocated to and fixed within a top or upper portion of the user interface 720, and atop any contact list displayed thereon. The selection of the selectable feature 786A also causes a font and style of the information regarding the corresponding contact 780 to change, thereby indicating that the contact 780 is one of the contacts with which the user regularly and/or frequently communicates. Additionally, as is shown in FIG. 7, the label on the selectable feature 786B indicates that the contact 780 will remain pinned in the contact list 730B until the selectable feature 786B is selected again.

Figure 8:
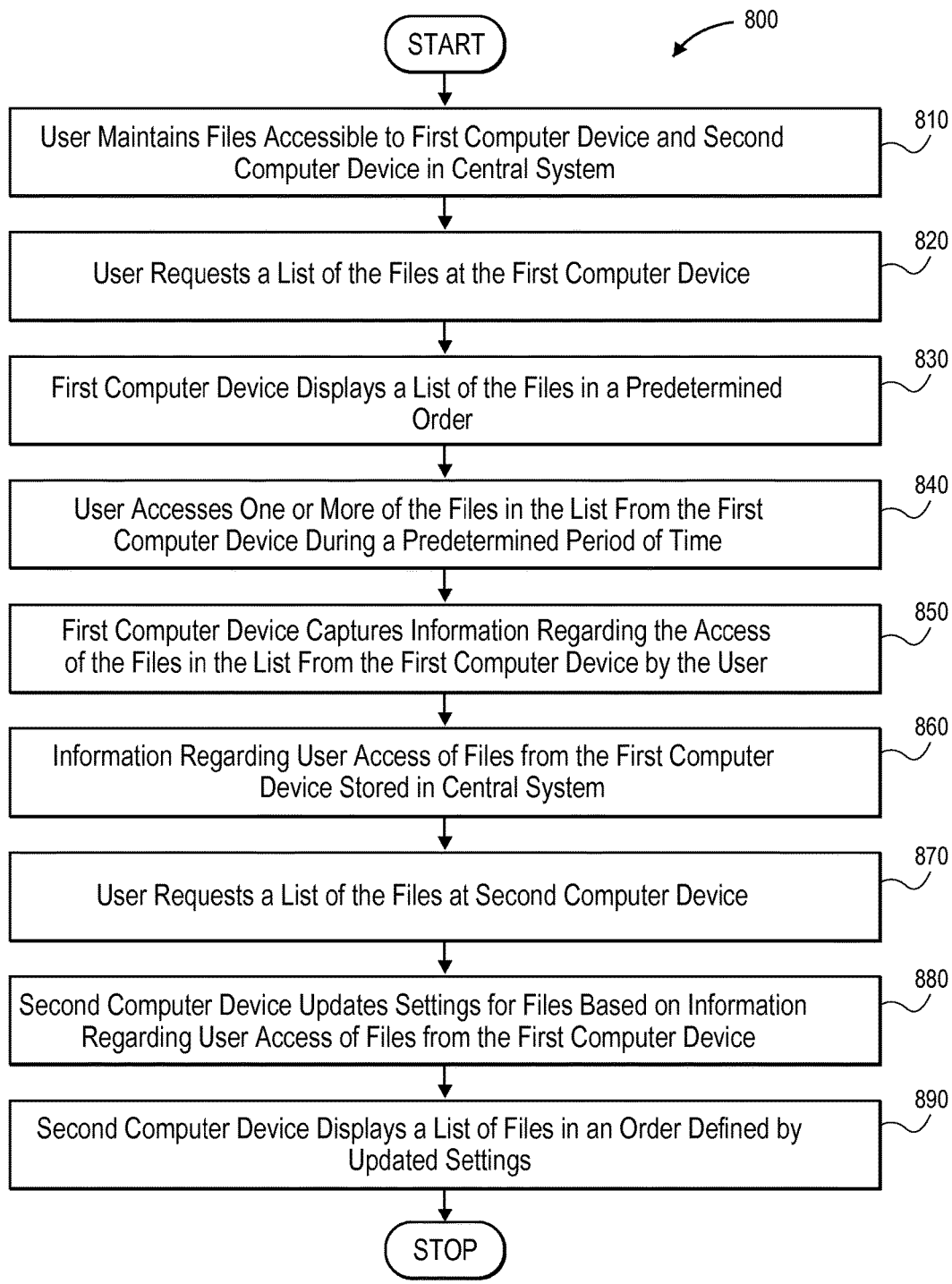
FIG. 8 is a flow chart of an illustrative process for providing smart file lists in accordance with embodiments of the present disclosure.

Additionally, as is also discussed above, the systems and methods of the present disclosure may consider events of a user's behavior or activity across a number of computer devices, and to define a display format for displaying a list of files on one computer device based on such events that may be observed on one or more other computer devices. Referring to FIG. 8, a flow chart 800 of one illustrative process for providing smart file lists in accordance with embodiments of the present disclosure is shown.

At box 810, a user maintains a set of files that may be accessed by a first computer device and a second computer device in a central system. For example, the user may maintain a set of contacts on an exchange server that may be accessed by either the first computer device or the second computer device. Alternatively, the user may maintain a set of media files (e.g., .MP3 audio files or movies) on a networked drive that may also be accessed by either the first computer device or the second computer device. At box 820, a user requests a list of files at the first computer device, and at box 830, the first computer device displays a list of the files in a predetermined order. For example, at box 840, a user may open a personal information management software application on one device and request to view information regarding the user's contacts on that device, and the contacts may be displayed in alphabetical order. Alternatively, the user may request to access a set of music files maintained on a cloud-based server from a mobile computer device, and a playlist or other grouping of the music files may be displayed on a user interface associated with that mobile computer device.

At box 850, the first computer device captures information regarding the user's access of the files in the list from the first computer device. For example, the first computer device may log any number of events such as telephone calls, E-mail messages or other electronic messages transmitted to contacts from the first computer device, or maintain a registry of music files played by the user, or movies viewed by the user, on the first computer device. At box 860, information regarding the user's access of files from the first computer device is stored in the central system. For example, the first computer device and the second computer device may be connected to a common network, and the information regarding the access may be stored in a networked drive, a cloud-based server or like data store that is also connected to the common network.

At box 870, the user requests a list of the files at the second computer device. For example, using a device other than the device from which the user requested the list of files at box 820, the user may open a personal information management software application and request to view a list of contacts. Alternatively, the user may open a media playing application and request to play one or more media files, or open a browser and request a list of bookmarks or other links. At box 880, the second computer device updates its settings for the files in the set based on the information regarding the user access of such files from the first computer device. For example, the second computer device may update one or more records to reflect the user's communications with one or more contacts from the first computer device, or update a log of media files or list of bookmarks to indicate that the user played various files or visited one or more web-based resources on the first computer device. At box 890, the second computer device displays the requested list of files in an order defined based on the updated settings.

Figure 9:
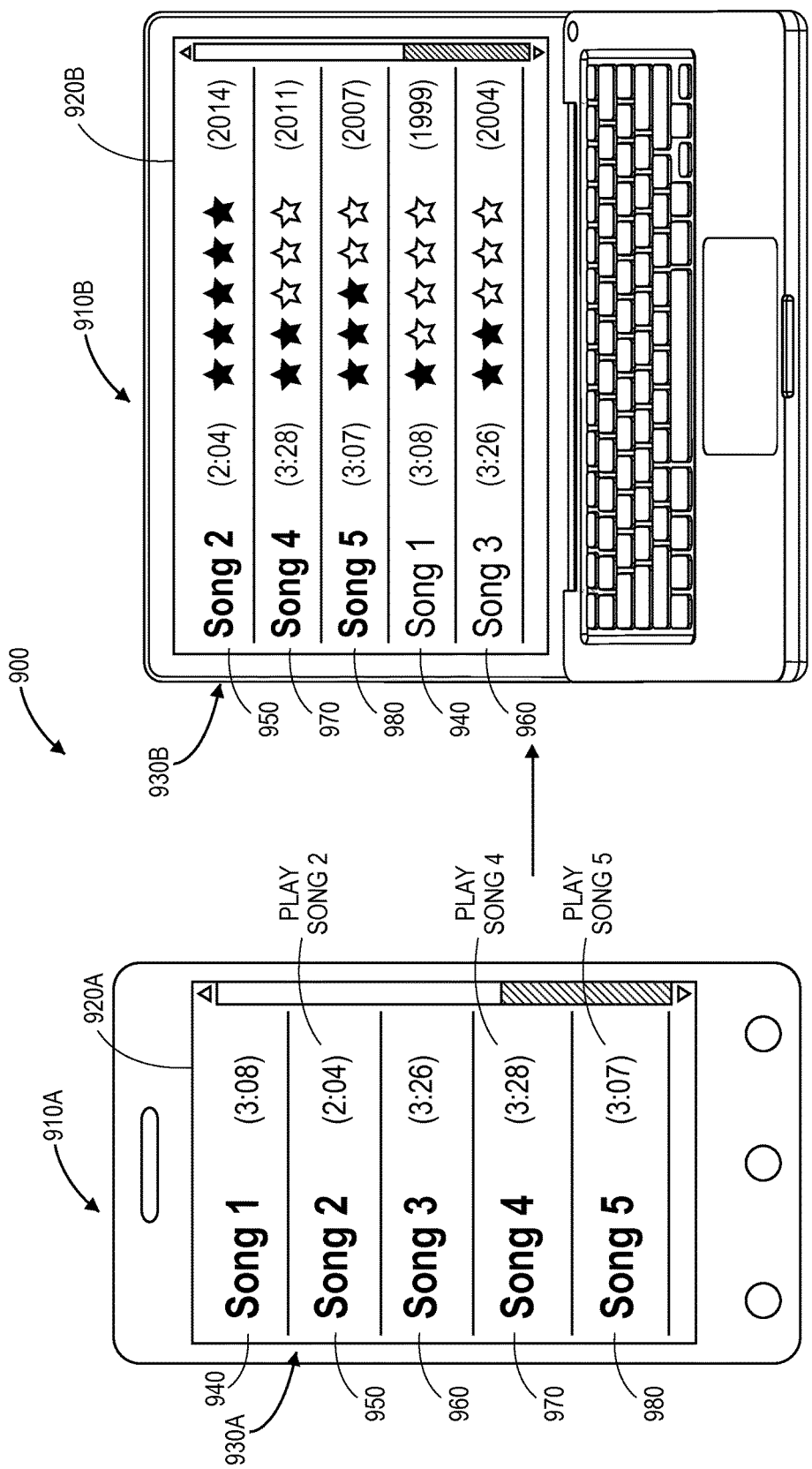
FIG. 9 shows an illustrative system for providing smart file lists in accordance with embodiments of the present disclosure.

The capacity of the systems and methods of the present disclosure to update a format for displaying a list of files on one computer device based on events of user behavior or activity observed from another computer device is shown with regard to FIG. 9. Referring to FIG. 9, a system 900 for providing smart file lists in accordance with embodiments of the present disclosure is shown. Except where otherwise noted, reference numerals preceded by the number "9" shown in FIG. 9 indicate components or features that are similar to components or features having reference numerals preceded by the number "7" shown in FIG. 7, by the number "6" shown in FIG. 6, by the number "4" shown in FIG. 4 or by the number "1" shown in FIG. 1.

As is shown in FIG. 9, the system 900 includes a first device 910A (viz., a smartphone) and a second device 910B (viz., a laptop computer). The first device includes a user interface 920A having a file list 930A displayed thereon. The file list 930A includes a plurality of media files 940, 950, 960, 970, 980, in serial order, that are available on both the first device 910A and the second device 910B. Additionally, as is shown in FIG. 9, a user of the first device 910A may request to play one or more of the files, viz., the media files 950, 970, 980, using the first device 910A, by selecting the files from the user interface 920A (e.g., by touching one or more portions of a display of the first device 910A).

As is discussed above with regard to the flow chart 800 of FIG. 8, where a user may access a set of files from multiple computer devices, the systems and methods of the present disclosure may track information regarding events of the user's behavior or activity regarding the files of the set that were observed from one or more of the computer devices, and modify a format for displaying information regarding such files in a list on any number of the other computer devices. As is shown in FIG. 9, the second device 910B includes a user interface 920B having a file list 930B displayed thereon. The file list 930B displayed on the second device 910B includes the plurality of media files 940, 950, 960, 970, 980 in an order defined based at least in part on the prior use of the media files 950, 970, 980 on the first device 910A. Additionally, the media files 950, 970, 980 are shown in the file list 930B in an emboldened style, while the media files 940, 960 are shown in the file list 930B in a standard style, based at least in part on the prior use of the media files 950, 970, 980 on the first device 910A.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the art would recognize that the systems and methods of the present disclosure are not limited for use on any one particular software application or computer device, or any one type of file (e.g., a contact), and may be used to generate lists of files of any type or form that may be modified or rearranged based on any information regarding a user's behavior or activity with regard to one or more of the items. The systems and methods disclosed herein may thus be utilized in connection with any number of software applications (e.g., word processors, web browsers, spreadsheets, presentation applications, E-mail clients) or computer devices (e.g., desktop computers, laptop computers, tablet computers or any kind of mobile device, such as a smartphone, or any other type of computer component) that may presently exist, or that may exist in the future, and are not limited to any of the software applications or computer devices referenced with one or more of the embodiments disclosed herein.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 3, 5 and 8, the order in which the blocks of the methods or processes are listed is not intended to be construed as a limitation on the claimed inventions, and any number of the method or process blocks can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to present that an item, term, etc. may be either X, Y, or Z, or a combination thereof. Thus, such conjunctive language is not generally intended to imply that certain embodiments require at least one of X, at least one of Y and at least one of Z to each is present.

Although the invention has been described and illustrated with respect to exemplary embodiments thereof, the foregoing and various other additions and omissions may be made therein and thereto without departing from the spirit and scope of the present disclosure.

What is claimed is:

1. A computer device having at least one computer display, wherein the computer device is configured to at least:
   receive a first request from a user to display a plurality of contacts on the at least one computer display at a first time;
   display a first list of the plurality of contacts in a first order on the at least one computer display, wherein a first contact of the plurality of contacts is displayed with a first aspect;
   determine that at least one first event associated with the user and the first contact of the plurality of contacts has occurred within a first predetermined period of time after the first time and before a second time;
   identify a second aspect for the first contact of the plurality of contacts based at least in part on the at least one first event;
   receive a second request from the user to display the plurality of contacts on the at least one computer display at the second time;
   display a second list of the plurality of contacts in the first order on the at least one computer display, wherein the first contact of the plurality of contacts is displayed with the second aspect;
   determine that at least one second event associated with the user and the first contact of the plurality of contacts has occurred within a second predetermined period of time after the second time and before a third time;
   identify a second order for the plurality of contacts based at least in part on the at least one second event;
   receive a third request from the user to display the plurality of contacts on the at least one computer display at the third time;
   display a third list of the plurality of contacts in the second order on the at least one computer display, wherein the first contact of the plurality of contacts is displayed in the second order with the second aspect;
   determine that at least one third event associated with the user and a second contact of the plurality of contacts has not occurred within at least one of the first predetermined period of time, the second predetermined period of time or a third predetermined period of time after the third time and before a fourth time;
   receive a fourth request from the user to display the plurality of contacts on the at least one computer display at the fourth time; and
   display a fourth list of the plurality of contacts in the second order on the at least one computer display, wherein the second contact of the plurality of contacts is not included in the fourth list.

2. The computer device of claim 1, wherein the first aspect comprises at least one of a first font, a first style, a first size or a first color, and
   wherein the second aspect comprises at least one of a second font, a second style, a second size or a second color.

3. The computer device of claim 1, wherein the computer device is further configured to at least:
   identify a plurality of events associated with the user and at least some of the plurality of contacts, and
   wherein the second order is defined based at least in part on times at which the plurality of events occurred.

4. A computer-implemented method comprising:
   identifying a first format for rendering a first list of a plurality of contacts in a first window in a first position on a user interface on a first computer device associated with a user;
   identifying information regarding at least one first event associated with the user and a first contact of the plurality of contacts, wherein the at least one first event occurred prior to a first time, and wherein the at least one first event comprises a first predetermined electronic communication between the user and the first contact;
   in response to identifying the information regarding the at least one first event,
      modifying the first format to a second format for rendering a second list of at least a portion of the plurality of contacts on the user interface based at least in part on the information regarding the at least one first event, wherein the portion of the plurality of contacts comprises the first contact, wherein the second format comprises at least one of a second aspect of the first contact in the second list or a second order of the first contact in the second list;

receiving a first request for information regarding at least some of the plurality of contacts from the first computer device at the first time; and rendering the second list of at least the portion of the plurality of contacts in accordance with the second format in the first window in response to the first request;

identifying information regarding a second contact of the plurality of contacts for which no events are observed prior to a second time, the second time being after the first time; and in response to identifying the information regarding the second contact, modifying the second format to a third format for rendering a third list of at least a portion of the plurality of contacts on the user interface based at least in part on the information regarding the second contact, wherein the portion of the plurality of contacts comprises the first contact, wherein the third format does not include the second contact in the third list;

receiving a second request for information regarding at least some of the plurality of contacts from the first computer device at the second time; and rendering the third list of at least the portion of the plurality of contacts in accordance with the third format in the first window in response to the second request.

5. The computer-implemented method of claim 4, wherein the first format comprises a first order for rendering the first list of the plurality of contacts, and wherein the second format comprises the second order for rendering the second list of at least the portion of the plurality of contacts.

6. The computer-implemented method of claim 5, wherein the first contact is ranked atop the second order.

7. The computer-implemented method of claim 4, wherein the first format comprises a first aspect for displaying the first contact, and wherein the second format comprises the second aspect for displaying the first contact.

8. The computer-implemented method of claim 7, wherein the first aspect comprises at least one of a first font, a first style, a first size or a first color, and wherein the second aspect comprises at least one of a second font, a second style, a second size or a second color.

9. The computer-implemented method of claim 4, wherein identifying information regarding the at least one first event comprises:

determining a first predetermined communication state of the first contact based at least in part on the first predetermined electronic communication between the user and the first contact, wherein the first predetermined communication state is one of a plurality of predetermined communication states, and wherein the second format is based at least in part on the first predetermined communication state of the first contact.

10. The computer-implemented method of claim 9, further comprising:

determining a display score for the first contact according to a display score function, wherein the first predetermined communication state of the first contact is defined based at least in part on the display score for the first contact.

11. The computer-implemented method of claim 10, wherein the display score function increases a value of the display score for the first contact based at least in part on the first predetermined electronic communication, and wherein the display score function decreases the value of the display score for the first contact if a second predetermined electronic communication between the user and the first contact is not observed within a predetermined period of time.

12. The computer-implemented method of claim 4, wherein the first predetermined electronic communication is at least one of a telephonic communication, an E-mail message, a text message, a social network message between the user and the first contact or a social network posting referencing the user by the first contact.

13. The computer-implemented method of claim 4, wherein the first predetermined electronic communication was transmitted from or received at the first computer device, and wherein the method further comprises:

receiving a third request for information regarding at least some of the plurality of contacts from a second computer device at the first time; and in response to receiving the third request for information regarding the at least some of the plurality of contacts from the second computer device, rendering the second list of at least the portion of plurality of contacts in accordance with the second format in a second window in a second position on a user interface of the second computer device in response to the third request.

14. The computer-implemented method of claim 4, wherein modifying the first format to the second format for rendering the second list of at least the portion of the plurality of contacts on the user interface comprises:

receiving an instruction from the first computer device, wherein the instruction requires the second format to include the first contact.

15. The computer-implemented method of claim 4, further comprising:

identifying information regarding the second contact of the plurality of contacts for which no events are observed prior to the first time, wherein the second format defines at least one of a third aspect of the second contact in the second list or a third order of the second contact in the second list.

16. The computer-implemented method of claim 4, further comprising:

identifying information regarding the second contact of the plurality of contacts for which no action by the user is observed prior to the first time, wherein the second format does not include the second contact in the second list.

17. A method comprising:

identifying a plurality of files associated with a user;

causing a display of a first list of at least some of the plurality of files on a first computer device at a first time, wherein the first list is displayed in accordance with a first display format, the first display format defining at least one of a first aspect or a first order of a first file in the first list, the first list including the first file and a second file of the plurality of files;

identifying a first event initiated by the user at the first computer device at a second time, wherein the second time is after the first time, and wherein the first event is associated with the first file of the plurality of files;

storing information regarding the first event in at least one data store;
determining that no events associated with the second file of the plurality of files have been initiated by the user at the first computer device at a third time, wherein the third time is after the second time;
storing information regarding the second file in the at least one data store;
identifying a second display format for displaying a second list of at least some of the plurality of files on a second computer device based at least in part on the information regarding the first event and the information regarding the second file, the second display format defining at least one of a second aspect or a second order of the first file in the second list, the second list not including the second file;
receiving a first request for information regarding the at least some of the plurality of files at the second computer device at a fourth time, wherein the fourth time is after the third time; and
in response to the first request for information regarding the at least some of the plurality of files,
causing a display of the second list of at least some of the plurality of files on the second computer device, wherein the second list is displayed in accordance with the second display format.

18. The method of claim 17, wherein the first display format defines the first order of the at least some of the plurality of files, and
wherein the second display format defines the second order of the at least some of the plurality of files.

19. The method of claim 17, wherein the first display format defines the first aspect of the first file of the plurality of files displayed in the first list, and
wherein the second display format defines the second aspect of the first file of the plurality of files displayed in the second list.

20. The method of claim 17, wherein the first file comprises a media file, and
wherein the first event initiated by the user at the first computer device is a playing of the media file by the first computer device.

* * * * *